May 28, 1968   C. M. TUCKER   3,385,955
COFFEE PERCOLATOR HAVING AUTOMATIC CONTROL CIRCUIT
Filed Oct. 22, 1965
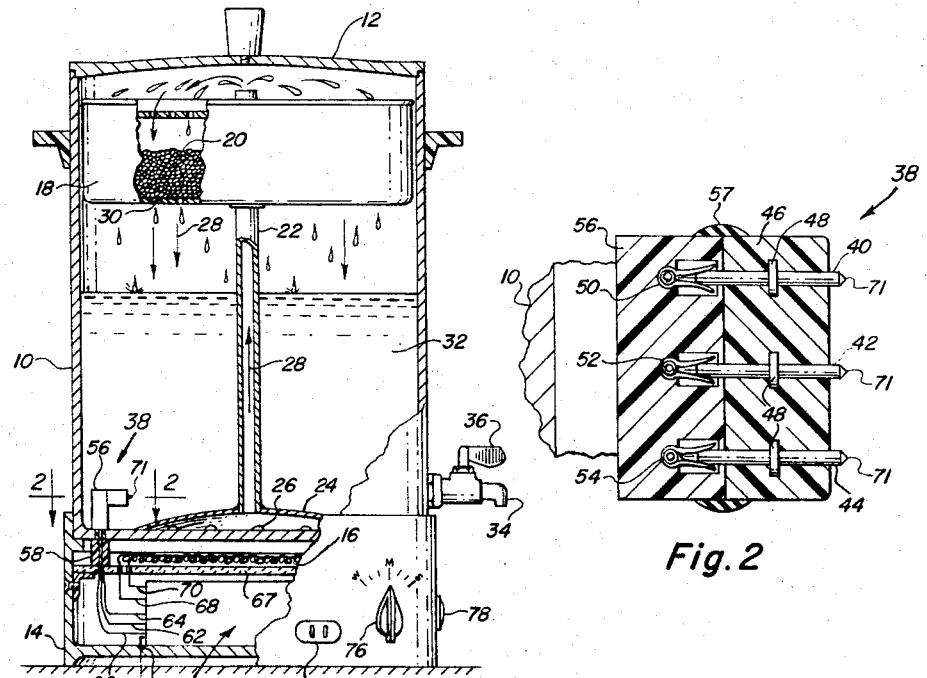
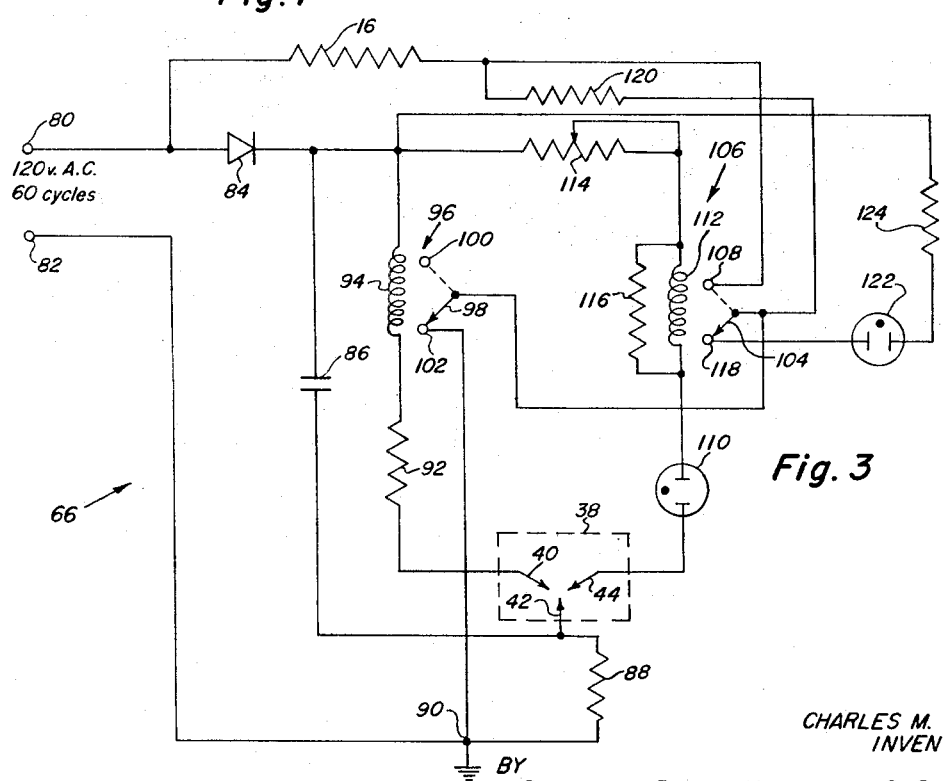
CHARLES M. TUCKER
INVENTOR.
BY
BUCKHORN, BLORE, KLARQUIST & SPARKMAN
ATTORNEYS

United States Patent Office 3,385,955
Patented May 28, 1968

3,385,955
COFFEE PERCOLATOR HAVING AUTOMATIC
CONTROL CIRCUIT
Charles M. Tucker, 195 N. Broadway,
Burns, Oreg. 97720
Filed Oct. 22, 1965, Ser. No. 500,497
8 Claims. (Cl. 219—441)

ABSTRACT OF THE DISCLOSURE

A coffee percolator is described having an automatic control circuit which stops the brewing operation when the electrical resistance of the coffee liquid reaches a predetermined value corresponding to the desired "strength" of such coffee liquid, and includes probe contacts immersed in such coffee liquid for measuring such resistance.

---

The subject matter of the present invention relates generally to coffee brewing apparatus of the type which recirculates heated water through coffee grounds to produce coffee liquid of a predetermined concentration or strength and automatically stops the brewing operation when such strength is reached, and in particular to a coffee percolator apparatus having an automatic control circuit including a probe which measures the electrical resistance of the coffee liquid and causes such circuit to automatically stop the percolating operation when the coffee liquid has reached a predetermined resistance related to its desired concentration or strength.

The automatic control circuit of the present invention is particularly useful in large coffee percolators of the urn type often employed in restaurants, but may be used with any type of coffee brewing apparatus in which the heated water is continuously recirculated through the coffee grounds.

Briefly, one embodiment of the coffee brewing apparatus of the present invention includes an electrical probe having a plurality of spaced, insulated electrodes extending into the coffee liquid adjacent the bottom of the percolator. The electrical resistance of substantially pure tap water is quite high, so that very little electrical current flows through the gap between the electrodes before the percolation process starts. As the water percolates through the coffee grounds, its electrical resistance decreases, thereby increasing the current flowing between the probe electrodes, until such current is sufficient to actuate a relay in the automatic control circuit of the present invention at a predetermined value of such resistance. The relay is connected to the electrical heating element of the percolator and effectively switches a high ballast resistance in series with such heater to decrease the heater current and lower the temperature of the water below that sufficient for percolation. However, the reduced current flowing through the heater is sufficient to continue to warm the coffee after the percolation process stops. When the level of the coffee liquid drops below that of the probe electrodes, another relay operates to disconnect the heating element from any current source.

A coffee percolator employing the automatic control circuit of the present invention has several advantages over conventional percolators, since it automatically stops the percolation process when the coffee liquid reaches a predetermined electrical resistance corresponding to the desired strength or concentration of such coffee liquid, whereas prior percolators operated manually or by means of a thermostat timer do not always produce coffee of the same strength. Furthermore, conventional coffee percolators frequently have no means for accurately varying the desired strength of the coffee in accordance with the taste of different individuals. While vacuum type coffee brewers such as that shown in U.S. Patent 2,539,541 of R. W. Kelly have been provided with automatic controls they do not enable different concentrations of coffee liquid to be made except by changing the amount of coffee grounds used, which is inaccurate and wasteful. This is accomplished quickly and easily in the apparatus of the present invention by adjusting a variable resistance in the control circuit to change the amount of current flowing between the probe electrodes for a given coffee resistance in order to actuate the relay which automatically stops the percolation process, at different values of such coffee resistance. In addition, the present coffee brewing apparatus also has the advantage that it automatically disconnects the heating element after substantially all of the coffee liquid is removed from the percolator when the level of such liquid falls below the probe electrodes, thereby conserving electrical power and increasing the life of the heating element.

It should be noted that there is no electrical shock hazard associated with a coffee percolator apparatus made in accordance with the present invention, because the current flowing between the proble electrodes is extremely small on the order of 1 to 3 milliamperes. In addition, the different probe electrodes are made of carbon and silver which prevent any appreciable electrolysis, thereby avoiding damage to the electrodes and preventing the coffee liquid from being provided with any unpleasant taste.

It is therefore one object of the present invention to provide an improved coffee brewing apparatus which automatically stops its brewing process when a predetermined coffee strength is reached, accurately and reliably by detecting changes in the electrical resistance of the coffee liquid.

Another object of the present invention is to provide an improved coffee percolator apparatus having an automatic control circuit in which an electrical probe is provided to sense the changes of electrical resistance of the coffee liquid and to cause such circuit to stop the percolation process when such resistance falls below a predetermined minimum value and also to completely disconnect the heater element of such percolator apparatus when the level of the coffee liquid falls below such probe.

A further object of the present invention is to provide an automatic control circuit for a coffee percolator which automatically reduces the current supplied to the heating element of such percolator to stop the percolation process when the concentration or strength of the coffee liquid reaches a desired predetermined value, such circuit being simple and inexpensive in construction as well as accurate and reliable in operation.

An additional object of the present invention is to provide a coffee percolator apparatus having an automatic control circuit including an adjustable control device whose setting may be varied to change the value of the electrical resistance of the coffee liquid at which such control circuit causes the percolation process to stop, in order to vary the strength or concentration of the coffee liquid produced by such apparatus over a range of predetermined values.

Other objects and advantages of the present invention will be apparent from the following detailed description of a preferred embodiment thereof, of which:

FIG. 1 is a side elevation view of a coffee percolator apparatus made in accordance with the present invention with parts broken away for purposes of clarity;

FIG. 2 is a horizontal sectional view taken along a line 2—2 of FIG. 1, showing the electrical probe employed in the percolator apparatus on an enlarged scale; and FIG. 3 is a schematic diagram of a preferred embodiment of the automatic control circuit employed with the apparatus of FIGS. 1 and 2.

As shown in FIG. 1, one embodiment of the coffee percolator apparatus of the present invention includes a coffee container or urn 10 having a lid 12 and a separate removable base unit 14 containing an electrical heater element 16. The coffee percolator may be of a conventional type having a perforated annular basket 18 for holding the coffee grounds 20 inside such basket and supported on a hollow tube 22 extending through the center of such basket adjacent the top of the container 10. The bottom of the tube 22 is supported in spaced relationship to the bottom of the container 10 by a perforated, cup-shaped support base 24 which is provided with a plurality of apertures 26 to enable liquid 32 within such container to pass through such apertures and up the inside of the tube 22, as indicated by arrows 28. This occurs during the percolation process when the water within the container is heated above the minimum temperature required for percolation to drive out enough of the air absorbed in such water to enable such air to force water up tube 22. The upper end of the tube 22 terminates in a position spaced adjacent the underside of the lid 12, so that the water forced up the tube during the percolation process strikes the underside of such lid and falls into the basket 18, where it passes through the coffee grounds 20 and out through the openings 30 in the bottom of such basket back into the water 32 to form liquid coffee. The coffee is dispensed out of the container 10 through a spigot or nozzle 34 having a valve which is opened or closed by handle 36.

An electrical probe 38 shows in greater detail in FIG. 2 is fastened to the bottom of the container 10, so that three spaced insulated electrodes 40, 42 and 44 extend into the liquid 32 adjacent the bottom of such container. The three electrodes 40, 42 and 44 may be thin cylindrical rods embedded in a block 46 of plastic insulating material and held in position by flanges 48 provided on the shafts of such rods. The rear ends of the electrodes 40, 42 and 44 extend through the block 46 into plug-in receptacles 50, 52 and 54, respectively, which are also supported in spaced insulated relationship by embedding them in a plastic support post 56, which extends through a fluid tight seal in the bottom of container 10. A layer 57 of plastic or rubber sealer may be provided over the junction of block 46 and support post 56 to provide a fluid tight seal here also. The receptacles 50, 52 and 54 are electrically connected to pins extending through the bottom end of the support post 56 which are engaged by pin receiving terminals in an electrical plug 58 attached to the base unit 14. The three pin receiving terminals of plug 58 are connected to three insulated wires 60, 62 and 64, which are electrically connected to an automatic control circuit 66 housed within the base unit 14 beneath the heater 16, which is supported on a ceramic plate 67 or other heat insulator and is also connected to such control circuit by wires 68 and 70 at the opposite ends of such heating element.

As shown in FIG. 2, each of the electrodes 40, 42 and 44 is provided with a conical pointed tip portion 71 which confines any electrolytic action to the tip and prevents an insulating coating from being formed on the electrodes. In addition, the two outer electrodes 40 and 44 may be made of carbon, while the inner electrode 42 is made of silver to reduce this electrolysis action. In one embodiment the electrodes 40, 42 and 44 are positioned horizontally in a plane parallel to the bottom of the container 10, with the outer electrodes being a distance of about ½ inch from the inner electrode and all electrodes extending about 1/16 inch out of the plastic block 46 into the coffee liquid 32.

As shown in FIG. 1, the base unit 14 is provided with an electrical power plug receptacle 72 which is connected to the control circuit 66 and may be provided with a grounded terminal. This ground terminal may be connected to the metal housing of the base unit 14 at a ground point 74 so that both the base unit and the coffee urn 10 resting on such base unit are electrically grounded to further eliminate any possibility of electrical shock. In addition, a control knob 76 may also be provided on the base unit 14 for selecting the strength or concentration of the coffee liquid desired by varying the setting of a movable contact on a variable resistance in the control circuit 66 which is shown in FIG. 3. Also an indicator 78 of transparent red plastic material may be provided on the side of the housing of the base unit 14 in position to receive light transmitted through a hole in such housing from an indicator lamp in the control circuit 66 which indicates both when the percolation process is finished and when coffee liquid remains within the container 10.

The automatic control circuit 66 is shown in FIG. 3 and includes a pair of input terminals 80 and 82 which are connected to the terminals of the power plug receptacle 72 on the base unit so that an alternating current of 120 volts having a frequency of 60 cycles per second is applied across such terminals. This A.C. voltage is rectified by a silicon rectifier 84 having its anode connected to input terminal 80 and its cathode connected through a filter capacitor 86 of 4 microfarads in series with a current limiting resistor 88 of 620 ohms to the other input terminal 82. The lower input terminal 82 may be grounded at ground point 90. Electrode 42 of the probe 38 is connected to the common terminal of capacitor 86 and resistor 88, while electrode 40 is connected through a current limiting resistor 92 of 22 kilohms in series with the actuating coil 94 of a relay 96 to the cathode of rectifier 84. The movable contact 98 of relay 96 is normally spring biased in the dotted line position into engagement with fixed contact 100, which is open circuited. In one embodiment the relay coil 94 has a D.C. resistance of 10 kilohms and such relay is designed to be actuated when 2.4 milliamperes of D.C. current flows through such coil and to be de-energized when the coil current falls below 1.8 milliamperes. When water is placed within the container 10, it provides a high resistance of about 10 kilohms between electrodes 40 and 42, which enables sufficient current to flow through coil 94 to actuate the relay and move the movable contact 98 into engagement with a fixed contact 102, which is connected to input terminal 82.

The movable contact 98 of relay 96 is connected to the movable contact 104 of a second relay 106, and the movable contact 104 is normally spring biased into engagement with a fixed contact 108 which is electrically connected to one end of the heating element 16 of about 12 ohms. The other terminal of heating element 16 is connected to the input terminal 80, so that when relay 96 is energized A.C. current flows through such heating element and contacts 104 and 108 of relay 106 as well as contacts 98 and 102 of relay 96 which form a series circuit between input terminals 80 and 82. In this position of the relay contacts the heating current is sufficient to cause percolation at a water temperature of about 180° F. and below the boiling point of such water.

The third electrode 44 of the probe is connected through a gas filled diode 110, such as a neon tube having a constant voltage drop of about 7 volts, or other voltage regulator device to one terminal of the actuating coil 112 of relay 106 which may have a D.C. resistance of 10 kilohms. The other terminal of coil 112 is connected through a variable resistance or rheostat 114 of 10 kilohms to the cathode of rectifier 84 so that D.C. current also flows through such coil when water is present in container 10 to complete the circuit between electrodes 44 and 42. However, a shunt resistance 116 of 10 kilohms is connected in parallel with coil 112 so that insufficient current flows through such coil to actuate relay 106 when the resistance of the liquid between electrodes 42 and 44 is high, as it is with ordinary tap water. After the percolation process starts due to the heat generated by current flowing through heating element 16, the resistance of the liquid 32 gradually decreases since the dissolved coffee in such liquid lowers its resistance. When the resistance of the coffee liquid between electrodes 42 and 44 reaches a predetermined value, which may be varied by changing the setting of the movable contact of rheostat 114 by means of knob 76 of FIG. 1, the current through coil 112 exceeds the minimum value of 2.4 milliamperes required to actuate relay 106. The use of the voltage regulator diode 110 greatly increases the sensitivity of the circuit since it causes the current through the relay coil 112 to increase in a nonlinear manner as the resistance of the liquid 32 decreases so that such current change is much greater than it otherwise would be if such diode were not used.

When relay 106 is energized movable contact 104 moves into engagement with a fixed contact 118 which breaks the direct connection of the end of the heating element 16 to input terminal 82 and instead connects the heating element through a ballast resistor 120 of about 2000 ohms to such input terminal. As a result the current flowing through the heating element 16 is greatly reduced so that the temperature of the coffee liquid falls below the minimum temperature necessary for percolation and such liquid stops moving up through tube 22 and down through the coffee grounds 20. This means that the coffee liquid 32 remains at the strength or concentration which provides such liquid with a sufficiently low electrical resistance to cause relay 106 to be actuated. Thereafter the reduced current flowing through heating element 16 and ballast resistor 120 serves merely to warm the coffee liquid.

An indicator lamp 122 which may be a gas diode as shown or an incandescent light bulb, is connected between the fixed contact 118 of relay 106 and the cathode of rectifier 84 in series with a current limiting resistor 124 of 120 kilohms. Thus when relay 106 is energized to stop the percolation process, indicator lamp 122 is turned on to emit light through the red plastic indicator 78 in the base unit 14 and indicates completion of such percolation process.

After substantially all of the coffee liquid 32 is removed from the container 10 so that the level of such liquid falls below the electrodes 40, 42 and 44, relays 96 and 108 are de-energized to return their movable contacts to the normal dotted line position shown. This disconnects the heating element 16 and prevents any further current from passing through such heating element. In addition it also disconnects the indicator lamp 122 to turn out the indicator light and thereby indicates that the percolator container is empty. It should be noted that it may be desirable to position the common electrode 42 slightly above the two outer electrodes 40 and 44 to insure that both relays 96 and 106 are de-energized at the same time when the liquid level falls below such common electrode. This will prevent relay 106 from being de-energized while relay 96 remains energized that might otherwise happen in the event that the liquid level fell below that of electrode 44 but remained above that of electrodes 40 and 42, which of course would again start the percolation process.

It will be obvious to those having ordinary skill in the art that many changes may be made in the details of the above described preferred embodiment of the present invention. Therefore the scope of the present invention should only be determined by the following claims.

I claim:
1. A coffee brewing apparatus, comprising:
 a coffee maker of the type which percolates water through coffee grounds to produce coffee liquid;
 heater means for heating the water;
 automatic switch means connected to said heater means, for changing the operation of said heater means between a first condition in which the heater means heats the water above the minimum temperature necessary to cause such water to percolate, and a second condition in which the heater means is prevented from heating the water up to said minimum temperature but warms the coffee liquid;
 detector means connected to said switch means, for sensing the changing electrical resistance of the coffee liquid and for transmitting an electrical signal to the switch means related to said resistance to actuate said switch means and cause the heater means to change from said first condition to said second condition when said resistance reaches a predetermined amount corresponding to the coffee liquid concentration desired.

2. A coffee brewing apparatus, comprising:
 a coffee maker of the type which recirculates water through coffee grounds to produce coffee liquid;
 electrical heater means for heating the water above the minimum temperature necessary to cause it to recirculate through the coffee grounds;
 automatic switch means connected to said heater means, for changing the electrical connection of said heater means between a first position in which the heater means heats the water above said minimum temperature, and a second position in which the heater means is prevented from heating the water up to said minimum temperature but warms the coffee liquid;
 detector means including probe electrodes connected to said switch means, for sensing the changing electrical resistance of the coffee liquid and for transmitting an electrical signal to the switch means related to said resistance to actuate said switch means from said first position to said second position when said resistance reaches a predetermined amount corresponding to the coffee liquid concentration desired, and for turning off the heater means when the level of the coffee liquid falls below said electrodes.

3. A coffee brewing apparatus, comprising:
 a coffee percolator of the type which percolates water through coffee grounds to produce coffee liquid;
 electrical heater means for heating the water above the minimum temperature necessary to cause it to recirculate through the coffee grounds;
 automatic switch means connected to said heater means, for changing the electrical connection of said heater means between a first position in which the heater means heats the water above said minimum temperature, and a second position in which the heater means is prevented from heating the water up to said minimum temperature but warms the coffee liquid;
 detector means including probe electrodes connected to said switch means, for sensing the decreasing electrical resistance of the coffee liquid and for transmitting an electrical signal to the switch means related to said resistance to actuate said switch means from said first position to said second position when said resistance reaches a predetermined amount corresponding to the coffee liquid concentration desired, and for turning off the heater means when the level of the coffee liquid falls below said electrodes; and
 means for varying the magnitude of said electrical resistance which must be reached to actuate said switch means in order to change the concentration of said coffee liquid reached when the percolation ceases.

4. A coffee brewing apparatus, comprising:
 a coffee percolator of the type which recirculates water through coffee grounds to produce coffee liquid;
 electrical heater means supported adjacent said percolator for heating the water above the minimum temperature necessary to cause it to recirculate through the coffee grounds;
 automatic switch means connected to said heater means, for changing the electrical connection of said heater means between a first position in which the heater current flowing through the heater means is sufficient to heat the water above said minimum temperature, and a second position in which the heater current is reduced to prevent heating the water up to said minimum temperature but to enable warming of the coffee liquid;

detector means including at least three spaced probe electrodes extending into the coffee liquid and connected to said switch means, for sensing the electrical resistance of the coffee liquid and for transmitting an electrical signal to the switch means related to said resistance to actuate said switch means from said first position to said second position when said resistance goes below a predetermined amount corresponding to the coffee liquid consistency desired, and another switch means connected to the probe electrodes for disconnecting said heater means from any current source when the level of said coffee liquid falls below said probe electrodes.

5. An automatic control circuit for a coffee percolator apparatus, comprising:

an electrical heating element;
an electrical probe including a plurality of spaced insulated electrodes;
a first relay having one of its switch contacts connected to said heating element, and having a first energizing coil connected to one of said electrodes of said probe;
a second relay having one of its switch contacts connected to a contact of said first relay, and having a second energizing coil connected to another of said electrodes of said probe;
voltage means for applying a source of supply voltage across said first and second coils in series with the electrodes of said probe to cause current to flow through said second coil of a sufficient amount to energize said second relay when water or coffee liquid is present between said electrodes and to cause said second relay to connect said heating element to said voltage means to enable current to flow through said heating element by way of the contacts of said first relay and cause percolation; and
control means connected to said first coil of said first relay, for determining when the resistance of the liquid coffee is low enough to enable the current flowing through the probe electrodes connected to said first coil to become sufficient to actuate said first relay and reduce the current flowing through said heating element sufficiently to stop percolation.

6. An automatic control circuit for a coffee percolator apparatus, comprising:

an electrical heating element;
an electrical probe including at least two spaced insulated electrodes;
a first relay having one of its fixed switch contacts connected directly to said heating element, and having a first energizing coil connected to one of said electrodes of said probe;
a second relay having its movable switch contact connected to the movable contact of said first relay, and having a second energizing coil connected to another of said electrodes of said probe;
voltage means for applying a source of supply voltage across said first and second coils in series with the electrodes of said probe to cause current to flow through said second coil of a sufficient amount to energize said second relay when water or coffee liquid is present between said electrodes and to move the movable contact of said second relay into engagement with a fixed contact connected to said voltage means thereby causing current to flow through said heating element by way of the contacts of said first relay to begin percolation;
control means for determining when the resistance of the liquid coffee is low enough to enable the current flowing through the probe electrodes connected to said first coil to become sufficient to actuate said first relay and to move the movable contact of said first relay out of engagement with said one fixed contact and into engagement with another fixed contact thereby reducing the current flowing through said heating element and stopping percolation,
said control means including a variable impedance connected in series with said first coil to change the amount of resistance of the coffee liquid required to provide sufficient current to actuate the first relay.

7. An automatic control circuit for a coffee percolator apparatus, comprising:

an electrical heating element;
an electrical probe including three spaced insulated electrodes;
a first relay having one of its fixed switch contacts connected directly to said heating element, and having a first energizing coil connected to one of said electrodes of said probe;
a ballast resistor connected between said heating element and the movable contact of said first relay;
a second relay having its movable switch contact connected to the movable contact of said first relay, and having a second energizing coil connected to another of said electrodes of said probe;
voltage means for applying a source of supply voltage between a third electrode of said probe and a common connection of said first and second coils to cause current to flow through said second coil of a sufficient amount to energize said second relay when water or coffee liquid is present between said electrodes and to move the movable contact of said second relay into engagement with a fixed contact connected to voltage means thereby causing current to flow through said heating element by way of the contacts of said first relay to begin percolation;
control means for determining when the resistance of the liquid coffee is low enough to enable the current flowing through the probe electrodes connected to said first coil to become sufficient to actuate said first relay and to move the movable contact of said first relay out of engagement with said one fixed contact and into engagement with another fixed contact so that the heating element is connected across said voltage means only through said ballast resistor, thereby reducing the current flowing through said heating element and stopping percolation;
said control means including a variable resistor connected in series with said first coil to change the amount of resistance of the coffee liquid required to provide sufficient current to actuate the first relay, and said control means including a voltage regulator device connected in series between said first coil and said another electrode of said probe.

8. An automatic control circuit for a coffee percolator apparatus, comprising:

an electrical heating element;
an electrical probe including three spaced insulated electrodes;
a first relay having one of its fixed switch contacts connected directly to said heating element, and having a first energizing coil connected to one of said electrodes of said probe;
a ballast resistor connected between said heating element and the movable contact of said first relay;
a second relay having its movable switch contact connected to the movable contact of said first relay, and having a second energizing coil connected to another of said electrodes of said probe;
voltage means including a rectifier for applying a source of D.C. supply voltage between a third electrode of said probe and a common connection of said first and second coils to cause current to flow through said second coil of a sufficient amount to energize said second relay when water or coffee liquid is present between said electrodes and to move the movable contact of said second relay into engagement with a fixed contact connected to said voltage means thereby causing current to flow through said heating element by way of the contacts of said first relay to begin percolation;

control means for determining when the resistance of the liquid coffee is low enough to enable the current flowing through the probe electrodes connected to said first coil to become sufficient to actuate said first relay and to move the movable contact of said first relay out of engagement with said one fixed contact and into engagement with another fixed contact thereby reducing the current flowing through said heating element and stopping percolation;

an indicator light source connected between said another fixed contact of said first relay and said voltage means to indicate when percolation stops;

said control means including a variable resistor connected in series with said first coil to change the amount of resistance of the coffee liquid required to provide sufficient current to actuate the first relay, and said control means including a voltage regulator gas discharge device connected in series between said first coil and said another electrode of said probe.

References Cited

UNITED STATES PATENTS

| | | | |
|---|---|---|---|
| 2,539,541 | 1/1951 | Kelley | 99—281 |
| 2,655,859 | 10/1953 | Bell | 99—281 |

RICHARD M. WOOD, *Primary Examiner.*

C. L. ALBRITTON, *Assistant Examiner.*